UNITED STATES PATENT OFFICE 2,164,156

TREATMENT OF WATER

Otto Liebknecht, Neubabelsberg, near Berlin, Germany, assignor to The Permutit Company, New York, N. Y., a corporation of Delaware No Drawing. Application May 4, 1937, Serial No. 140,731. In Germany May 7, 1936

9 Claims. (Cl. 210—24)

This invention or discovery relates to treatment of water; and it comprises a method of abstracting acids from water, in which the water is passed in contact with extended surfaces of hide, leather, wool, derivatives thereof or similar keratiniferous substances, whereby acid is extracted, the operation being interrupted occasionally, the kerantiniferous surfaces regenerated by a treatment with an alkaline solution, and operation resumed; all as more fully hereinafter set forth and as claimed.

In ordinary water the amount of foreign substances in solution is always very little, being of the order of parts per million or milligrams per liter and methods of treatment must be adapted for handling large volumes. In conditioning water for laundry and boiler purposes, it is customary to remove the hardness giving constituents, lime and magnesia, either by base exchange or by a soda lime treatment. In either event, sodium compounds are added to the water in lieu of the removed lime and magnesia. A water thus conditioned does not give scale in the boiler but a high saline content builds up in the boiler liquor as steam is produced. Waters treated in either way have no free mineral acid other than $CO_2$, which would make them corrosive. In some rather newer methods of treating water to avoid producing a high saline content, bases, lime, magnesia or soda, are removed by an analogous operation: exchange for hydrogen. The substances capable of effecting this result are often called hydrogen zeolites. Various preparations containing or derived from humic bodies are used for this purpose: peat, lignite, coals, etc., as well as preparations made by sulfating these bodies or treating them with dehydrating agents. Insofar as the salines in the water are carbonates this method of treatment is efficient, since the $CO_2$ left in the water can be easily removed; but insofar as sulfates and chlorides are present, free corrosive acid may be left in the water.

I have discovered that acid effluent waters from treatment with hydrogen-ion zeolites can be conveniently de-acidified by contact with extensive surfaces of keratin (wool, leather, hide, horn, etc.); and afterwards regenerated by an alkaline wash. Neutral water free of salines is produced. Keratin materials may also be conveniently used in the case of some natural acid water containing traces of free mineral acid.

The described double treatment, first with a hydrogen-ion zeolite and then with a keratin material, each being regenerated in appropriate manner from time to time, offers a convenient and practical way of obtaining pure waters from waters carrying saline matter.

Suitable keratinous substances include, beside wool, leather and horn, other animal fibers and animal skins, in raw and tanned condition. Chrome-tanned leather, is useful. Some of these substances, such as horn, are, like wool, insoluble in water and can be used directly, while others, like glue and gelatin which may be regarded as modified forms of keratin, can be suitably treated to make them insoluble. Thus they can be tanned, treated with formaldehyde or chromic acid or coagulated by heat. In all cases it is provided that extensive surfaces of the substances are exposed to the water; the substance is used in the form of threads, granules, fibres and similar small particles of shape somewhat depending on the character of the material. Horn shavings, leather scrap and wool threads are examples.

The substances take up substantial quantities of acid before approaching exhaustion. When exhausted, they are rivivified in a manner somewhat analogous to the regeneration of base exchange materials, by treatment with solutions of bases. The base may be a dilute solution of a strong alkali like caustic soda or soda ash or of a less aggressive alkaline substance such as sodium bicarbonate or ammonia. Ammonia has less destructive action on the wool than stronger alkalies and is better for use with this material.

In most cases conditions are such that not all the acid is abstricted. Any small quantities remaining can be removed in known ways by neutralization.

In an example of a specific embodiment of the invention, there was provided a container having a bed of 19 kilograms of chrome leather parings which had previously been soaked in water and freed of the lime contained therein from previous wash processes. The water to be de-acidified was a dilute sulfuric acid, 0.008 normal. Some 3000 to 3500 liters of this acid water were passed through the bed before exhaustion was approached. At the end of this time the effluent water showed only 25 per cent of the original acid content. The bed was then rivivified with a sodium carbonate solution and its effectiveness for acid removal thereby restored.

Similar results are obtained with fibrous wool, in which case the efficiency is greater the more delicate or fine the wool fibers, since the surface is thereby increased. The acid absorbing reaction appears to take place essentially at the surface of the wool substance, without previous modification of the chemical character of the wool keratin.

As stated, the invention is especially useful in conjunction with base removal with the aid of hydrogen zeolites of the carbonaceous type. Raw hard water may be passed through a bed of sulfated lignite having exchangeable hydrogen, to abstract the bases, and the effluent passed through a bed of leather etc., according to the invention for removal of acids; the two beds being regenerated from time to time respectively with acid and with a base.

In many cases the substances used have inherently good mechanical properties for use as beds in apparatus analogous to water softeners and filters. In some cases it is advantageous to have the substances supported on carrier bodies. For example, using glue, gelatine or other water-soluble albumen substance, solutions of these may be applied to porous carrier bodies, and then the glue, etc., hardened and insolubilized by treatment with formaldehyde or chromic acid or by heat. Pumice stone, coke and the like may be used for the carrier.

With keratin and keratiniferous materials, it is often advantageous to give a preliminary treatment lessening the tendency to water absorption with swelling. This may be done with any of the ordinary tanning agents, including tannin, chromic acid, formaldehyde, etc. Any of the ordinary tanning agents used in making leather from hide may be here used.

What I claim is:

1. A process for de-acidifying water, comprising passing the water containing free acid in contact with extensive surfaces of a keratin substance in insoluble condition and regenerating the keratin substance from time to time by washing with dilute alkaline solutions.

2. A process for de-acidifying water, comprising passing the water in contact with extensive surfaces of insoluble keratin, and regenerating the keratin from time to time by a weak alkaline solution.

3. A process for de-acidifying water, comprising passing the water in contact with an insoluble keratin substance displayed on inert carrier bodies and regenerated by a basic wash.

4. A process for de-acidifying water, comprising passing the water in contact with an insoluble keratin substance freed of its lime content and with regeneration of said substance by alkaline washes.

5. In the purification of water containing salines, a two-stage operation which comprises first passing the water in contact with carbonaceous hydrogen zeolite material abstracting therefrom bases of said salines and afterwards in contact with a keratiniferous material abstracting residual free acids, the carbonaceous material and the keratiniferous material being regenerated from time to time by treatment with acid and with base respectively.

6. The matter of claim 5 wherein the carbonaceous material is of humic nature.

7. The matter of claim 5 wherein the carbonaceous material is a sulfated humus material.

8. In the purification of water containing salines, a two-stage operation which comprises first passing the water in contact with carbonaceous material abstracting bases therefrom and then in contact with a keratin material adapted to remove residual acids from the water, the carbonaceous material and the acid-removing material being regenerated from time to time by treatment with an acid and with a base respectively.

9. In de-acidifying water of acid character the process which comprises alternately contacting such a water with extensive surfaces of fibrous wool and regenerating said surfaces by an alkaline treatment.

OTTO LIEBKNECHT.